(12) United States Patent
Toba (10) Patent No.: US 8,125,527 B2
(45) Date of Patent: Feb. 28, 2012

(54) MOTION DETECTION APPARATUS

(75) Inventor: Akira Toba, Moriguchi (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 381 days.

(21) Appl. No.: 12/411,809

(22) Filed: Mar. 26, 2009

(65) Prior Publication Data

US 2009/0244297 A1 Oct. 1, 2009

(30) Foreign Application Priority Data

Mar. 26, 2008 (JP) ................................ 2008-080154

(51) Int. Cl.
*H04N 5/228* (2006.01)
*H04N 7/18* (2006.01)
(52) U.S. Cl. .................... 348/208.6; 348/208.1; 348/155
(58) Field of Classification Search ........... 348/154–155
See application file for complete search history.

(56) References Cited

U.S. PATENT DOCUMENTS

| 5,563,652 | A | | 10/1996 | Toba et al. | |
|---|---|---|---|---|---|
| 6,144,405 | A | * | 11/2000 | Toba | 348/208.4 |
| 7,623,153 | B2 | * | 11/2009 | Hatanaka | 348/208.3 |
| 2007/0002145 | A1 | * | 1/2007 | Furukawa | 348/207.99 |
| 2007/0092009 | A1 | * | 4/2007 | Muraki | 375/240.16 |
| 2007/0188619 | A1 | * | 8/2007 | Kurata | 348/208.99 |

FOREIGN PATENT DOCUMENTS

| JP | 61-201581 A | 9/1986 |
|---|---|---|
| JP | 06-153059 A | 5/1994 |
| JP | 07-038800 A | 2/1995 |
| JP | 2001-223932 A | 8/2001 |
| JP | 2002-300460 A | 10/2002 |
| JP | 2003-015028 A | 1/2003 |

* cited by examiner

*Primary Examiner* — Ngoc-Yen Vu
(74) *Attorney, Agent, or Firm* — Westerman, Hattori, Daniels & Adrian, LLP (57) ABSTRACT

A motion detection apparatus includes a CPU. The CPU detects partial motion vectors of an object scene corresponding to motion detection blocks based on raw image data. The CPU also reduces a weighted amount allocated to a motion detection block which captures a partial object scene having a contrast below a reference out of the motion detection blocks. Furthermore, the CPU performs a weighted average process referring to the weighted amount on the partial motion vectors so as to detect a motion of the entire object scene. The CPU obtains a minimum correlation value of a luminance difference between frames of the raw image data corresponding to each of the motion detection blocks, and executes a process for increasing the reference according to an increase of the obtained minimum correlation value corresponding to the motion detection block which captures the partial object scene having a contrast below the reference.

9 Claims, 10 Drawing Sheets

(A) MOTION DETECTION BLOCK        (B) MINUTE BLOCK

MOTION DETECTION APPARATUS

CROSS REFERENCE OF RELATED APPLICATION

The disclosure of Japanese Patent Application No. 2008-80154, which was filed on Mar. 26, 2008 is incorporated herein by reference.

BACKGROUND OF THE INVENTION

1. Field of the Invention

The present invention relates to a motion detection apparatus. More particularly, the present invention relates to a motion detection apparatus that is applied to a video camera and that detects a motion of an entire object scene captured on an imaging surface.

2. Description of the Related Art

According to one example of this type of an apparatus, whether each of a plurality of detection regions allocated to a screen is valid/invalid is determined based on a minimum correlation value and an average correlation value calculated by a motion detection circuit Specifically, a detection region having an average correlation value exceeding seven times the minimum correlation value is determined as a valid region, while a detection region having an average correlation value equal to or less than seven times the minimum correlation value is determined as an invalid region. A total motion vector is detected in a manner which is different according to the number of valid regions, and shaking of an imaging surface is corrected by referencing the detected total motion vector. However, when a moving object enters the detection region that captures an object scene of low contrast, the average correlation value calculated in this detection region increases. When the increased average correlation value exceeds seven times the minimum correlation value, this detection region changes from an invalid region to a valid region, and the motion of the moving object is reflected in a detection process of the total motion vector.

SUMMARY OF THE INVENTION

A motion detection apparatus according to the present invention, comprises: a first detector for detecting a motion of a partial object scene captured in each of a plurality of blocks allocated to an object scene based on image data repeatedly outputted from an imager; a reducer for reducing a weighted amount allocated to a block in which a partial object scene having a contrast below a reference is captured, out of a plurality of weighted amounts respectively allocated to the plurality of blocks; a second detector for detecting a motion of the entire object scene by performing a weighted average process in which the plurality of weighted amounts are referenced on the motion detected by the first detector; a first obtainer for repeatedly obtaining a minimum correlation value of a luminance difference between screens of the image data outputted from the imager, corresponding to each of the plurality of blocks; and an increaser for executing a process for increasing the reference according to an increase of the minimum correlation value obtained by the first obtainer, corresponding to the block in which the partial object scene having the contrast below the reference is captured.

Preferably, there is further provided a second obtainer for repeatedly obtaining an average correlation value of a luminance difference between screens of image data outputted from the imager, corresponding to each of the plurality of blocks. The reducer compares the average correlation value obtained by the second obtainer with the reference so as to determine the contrast.

Preferably, there is further provided an extractor for extracting one portion of the image data outputted from the imager so that a motion detected by the second detector is compensated.

Further preferably, the extractor includes: a writer for writing the image data outputted from the imager into a memory; a reader for reading out one portion of image data belonging to an extraction area, out of the image data accommodated in the memory by writer; and a changer for changing a position of the extraction area so that the motion detected by the second detector is compensated.

Preferably, there is further provided a starter for starting the increaser corresponding to the block in which an object having a motion amount below a threshold value is captured.

Preferably, there is further provided an initializer for initializing the reference increased by the increaser after an elapse of a designated period.

Preferably, each of the plurality of blocks includes a plurality of minute blocks. There is further provided a difference calculator for calculating, as a correlation value, a difference between a representative pixel value in image data of a previous screen and each of a plurality of pixel values in image data of a current screen, for each minute block.

A motion detection program product according to the present invention is a motion detection program product executed by a processor of a motion detection apparatus, comprising: a first detecting step of detecting a motion of a partial object scene captured in each of a plurality of blocks allocated to an object scene based on image data repeatedly outputted from an imager; a reducing step of reducing a weighted amount allocated to a block in which a partial object scene having a contrast below a reference is captured, out of a plurality of weighted amounts respectively allocated to the plurality of blocks; a second detecting step of detecting a motion of the entire object scene by performing a weighted average process in which the plurality of weighted amounts are referenced on the motion detected in the first detecting step; an acquiring step of repeatedly acquiring a minimum correlation value of a luminance difference between screens of image data outputted from the imager, corresponding to each of the plurality of blocks; and an increasing step of executing a process for increasing the reference according to an increase of the minimum correlation value obtained in the acquiring step, corresponding to the block in which the partial object scene having the contrast below the reference is captured.

A motion detection method according to the present invention is a motion detection method executed by a motion detection apparatus, comprising: a first detecting step of detecting a motion of partial object scene captured in each of a plurality of blocks allocated to an object scene based on image data repeatedly outputted from an imager; a reducing step of reducing a weighted amount allocated to a block in which a partial object scene having a contrast below a reference is captured, out of a plurality of weighted amounts respectively allocated to the plurality of blocks; a second detecting step of detecting a motion of the entire object scene by performing a weighted average process in which the plurality of weighted amounts are referenced on the motion detected in the first detecting step; an acquiring step of repeatedly acquiring a minimum correlation value of a luminance difference between screens of image data outputted from the imager, corresponding to each of the plurality of blocks; and an increasing step of executing a process for increasing the reference according to an increase of the minimum correlation value obtained in the acquiring step, corresponding to the block in which the partial object scene having the contrast below the reference is captured.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
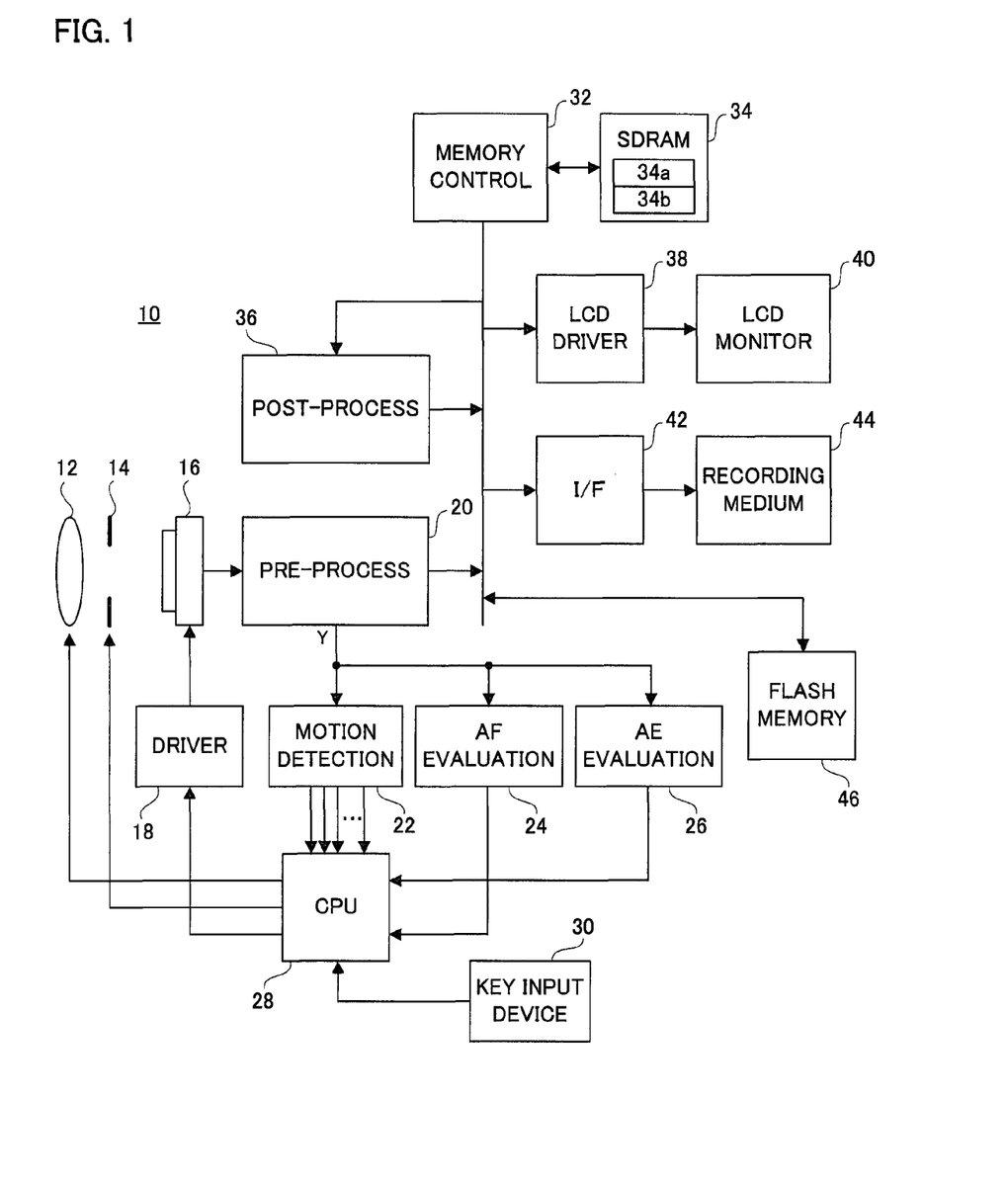
FIG. 1 is a block diagram showing a configuration of one embodiment of the present invention.

With reference to FIG. 1, a digital video camera 10 of this embodiment includes an optical lens 12 and an aperture unit 14. An optical image of an object scene is irradiated onto an imaging surface of an image sensor 16 through these members. The imaging surface is covered with a primary color filter (not shown) having a Bayer array. Therefore, in each pixel, electric charges having any one of color information, i.e., R (Red), G (Green), and B (Blue), are produced by photoelectric conversion.

When a power source is turned on, a CPU 28 stats a driver 18 in order to execute a moving-image fetching process. In response to a vertical synchronization signal Vsync generated at every 1/60 seconds, the driver 18 exposes the imaging surface and reads out the electric charges produced on the imaging surface in a raster scanning manner. From the image sensor 16, raw image data representing an object scene is outputted at a frame rate of 60 fps.

A pre-processing circuit 20 performs processes, such as digital clamp, pixel defect correction, and gain control, on the raw image data from the image sensor 16. The raw image data produced thereby is written into a raw image area 34a of an SDRAM 34 through a memory control circuit 32.

Figure 2:
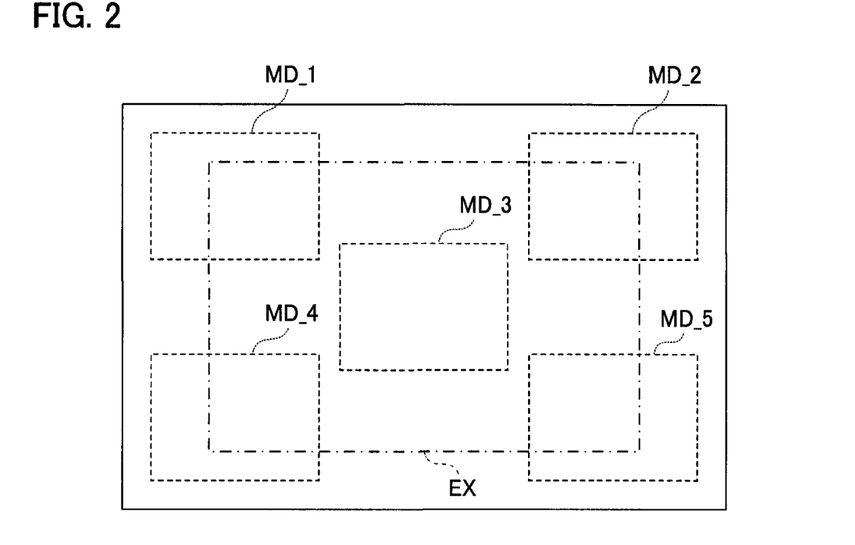
FIG. 2 is an illustrative view showing one example of a state that a plurality of motion detection blocks and a single extraction area are allocated to an imaging surface.

In the imaging surface, an extraction area EX is allocated according to a procedure shown in FIG. 2. A post-processing circuit 36 reads out one portion of the raw image data belonging to the extraction area EX, out of the raw image data accommodated in the raw image area 34a through the memory control circuit 32 at every 1/60 seconds, and performs processes, such as a color separation, a white balance adjustment, and a YUV conversion, on the read-out raw image data. As a result, image data corresponding to a YUV format is created at every 1/60 seconds. The created image data is written into a YUV image area 34b of the SDRAM 34 through the memory control circuit 32.

The LCD driver 38 repeatedly reads out the image data accommodated in the YUV image area 34b and drives an LCD monitor 40 based on the read-out image data. As a result, a real-time moving image (through image) representing an object scene is displayed on a monitor screen.

The pre-processing circuit 20 executes a simple Y producing process in addition to the above-described processes so as to simply convert the raw image data into Y data. The converted Y data is applied to a motion detection circuit 22, an AF evaluation circuit 24, and an AE evaluation circuit 26.

With reference to FIG. 2, five motion detection blocks MD_1 to MD_5 are allocated to the imaging surface. The motion detection blocks MD_1 and MD_2 are arranged on the upper side of the imaging surface so as to be lined in a horizontal direction, the motion detection block MD_3 is arranged in the center of the imaging surface, and the motion detection blocks MD_4 and MD_5 are arranged on the lower side of the imaging surface so as to be lined in a horizontal direction.

Figure 3:
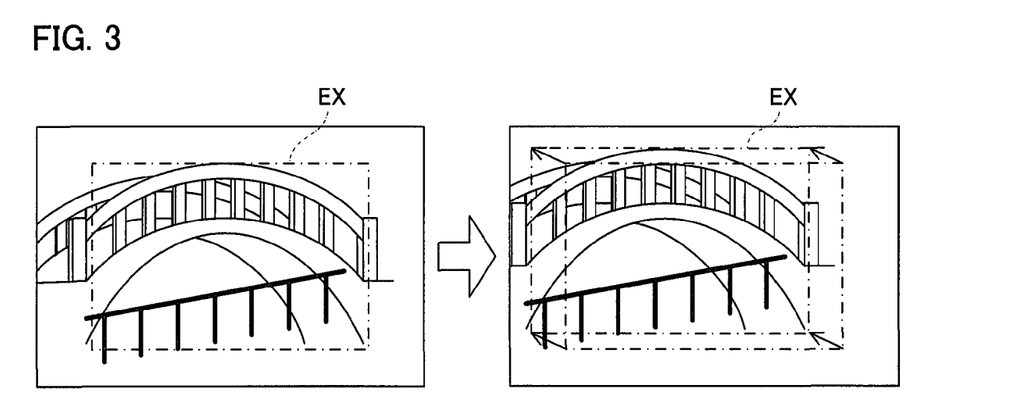
FIG. 3 is an illustrative view showing one example of a image stabilizing operation.

The motion detection circuit 22 detects motion information of the object scene in each motion detection block MD_1 to MD_5 at every 1/60 seconds based on the Y data applied from the pre-processing circuit 20, and applies the detected motion information to the CPU 28. The CPU 28 creates a total motion vector based on the applied motion information, determines whether a motion in the imaging surface in a direction orthogonal to an optical axis is caused due to shaking or a pan/tilt operation based on the total motion vector. When the motion of the imaging surface is caused due to shaking, the CPU 28 moves the extraction are a EX along the total motion vector. A position of the extraction area EX is changed in a manner to compensate (offset) the motion of the imaging surface caused due to shaking. When shaking occurs in the imaging surface, the extraction area EX moves on the imaging surface according to a procedure shown in FIG. 3. As a result, the shaking of the moving image outputted from the LCD monitor 40 is restrained.

Out of the Y data outputted from the pre-processing circuit 20, the AF evaluation circuit 24 integrates a high-frequency component of one portion of the Y data belonging to the evaluation area (not shown) at every 1/60 seconds, and applies the integrated value, i.e., a focus evaluation value, to the CPU 28. Based on the applied focus evaluation value, the CPU 28 executes a so-called continuous AF process, and arranges the optical lens 12 on a focal point. As a result, the clarity of the moving image outputted from the LCD monitor 40 is improved continuously.

Out of the Y data outputted from the pre-processing circuit 20, the AE evaluation circuit 26 integrates one portion of the Y data belonging to the evaluation area at every 1/60 seconds, and outputs the integrated value, i.e., a luminance evaluation value. Based on the luminance evaluation value outputted from the AE evaluation circuit 24, the CPU 28 calculates an EV value at which the appropriate exposure amount is acquired, and sets an aperture amount and an exposure time for defining the calculated EV value to the aperture unit 14 and the driver 18. As a result, the brightness of the moving image outputted from the LCD monitor 40 is adjusted moderately.

When a recording start operation is performed by a key input device 30, the CPU 28 starts an I/F 42 in order to start a recording process. The I/F 42 reads out the image data accommodated in the YUV image area 34b at every 1/60 seconds, and writes the read-out image data in a moving image file within a recording medium 44 in a compressed state. The I/F 42 is stopped by the CPU 28 when a recording end operation is performed on the key input device 30. As a result, the recording process of the image data is ended.

Figure 4:
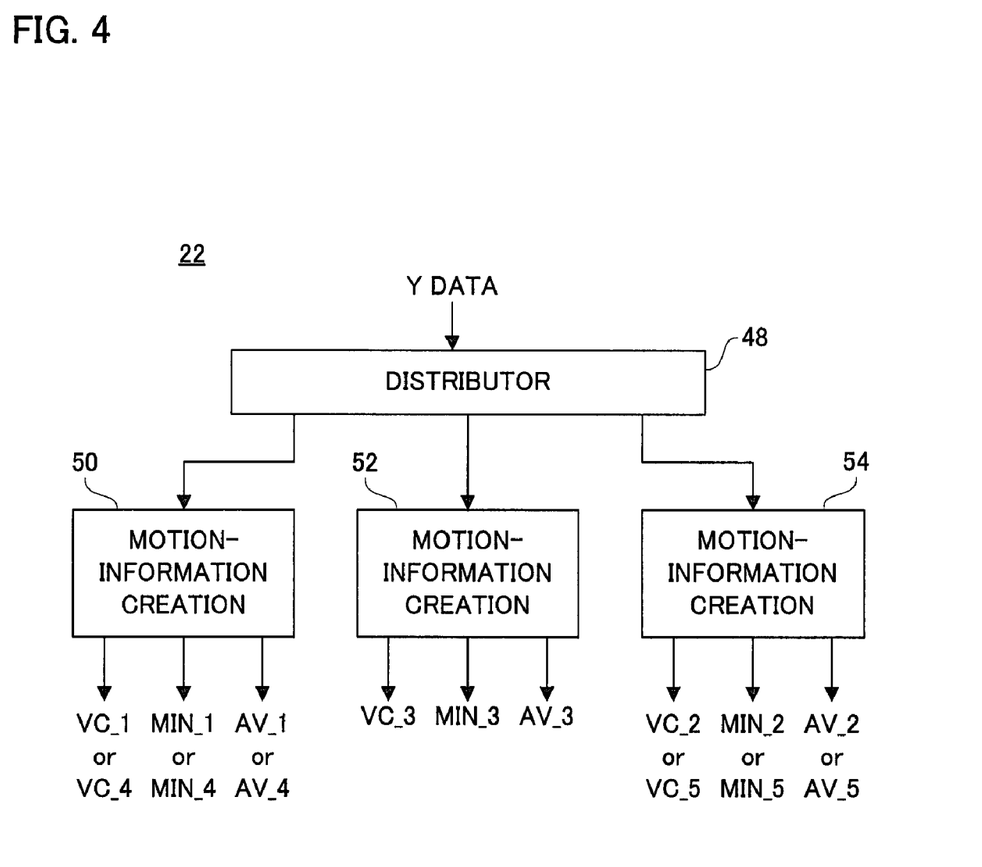
FIG. 4 is a block diagram showing one example of a configuration of a motion detection circuit applied to the embodiment in FIG. 1.

The motion detection circuit 22 is configured as shown in FIG. 4. The raw image data is outputted from the image sensor 16 in a raster scanning manner, and therefore, the Y data is also inputted into the motion detection circuit 22 in a raster scanning manner. A distributor 48 applies the Y data belonging to the motion detection blocks MD_1 and MD_4 to a motion-information creating circuit 50, the Y data belonging to the motion detection block MD_3 to a motion-information creating circuit 52, and the Y data belonging to the motion detection blocks MD_2 and MD_5 to a motion-information creating circuit 54.

The motion-information creating circuit 50 notices the motion of the object scene captured in each of the motion detection blocks MD_1 and MD_4, outputs a partial motion vector VC_1, a minimum correlation value MIN_1, and an average correlation value AV_1 as the motion information of the motion detection block MD_1, and also outputs a partial motion vector VC_4, a minimum correlation value MN_4, and an average correlation value AV_4 as the motion information of the motion detection block MD_4.

The motion-information creating circuit 52 notices the motion of the object scene captured in the motion detection block MD_3, and outputs a partial motion vector VC_3, a minimum correlation value MN_3, and an average correlation value AV_3 as the motion information of the motion detection block MD_3.

The motion-information creating circuit 54 notices the motion of the object scene captured in each of the motion detection blocks MD_2 and MD_5, outputs a partial motion vector VC_2, a minimum correlation value MN_2, and an average correlation value AV_2 as the motion information of the motion detection block MD_2, and also outputs a partial motion vector VC_5, a minimum correlation value MIN_5, and an average correlation value AV_5 as the motion information of the motion detection block MD_5.

Figure 5:
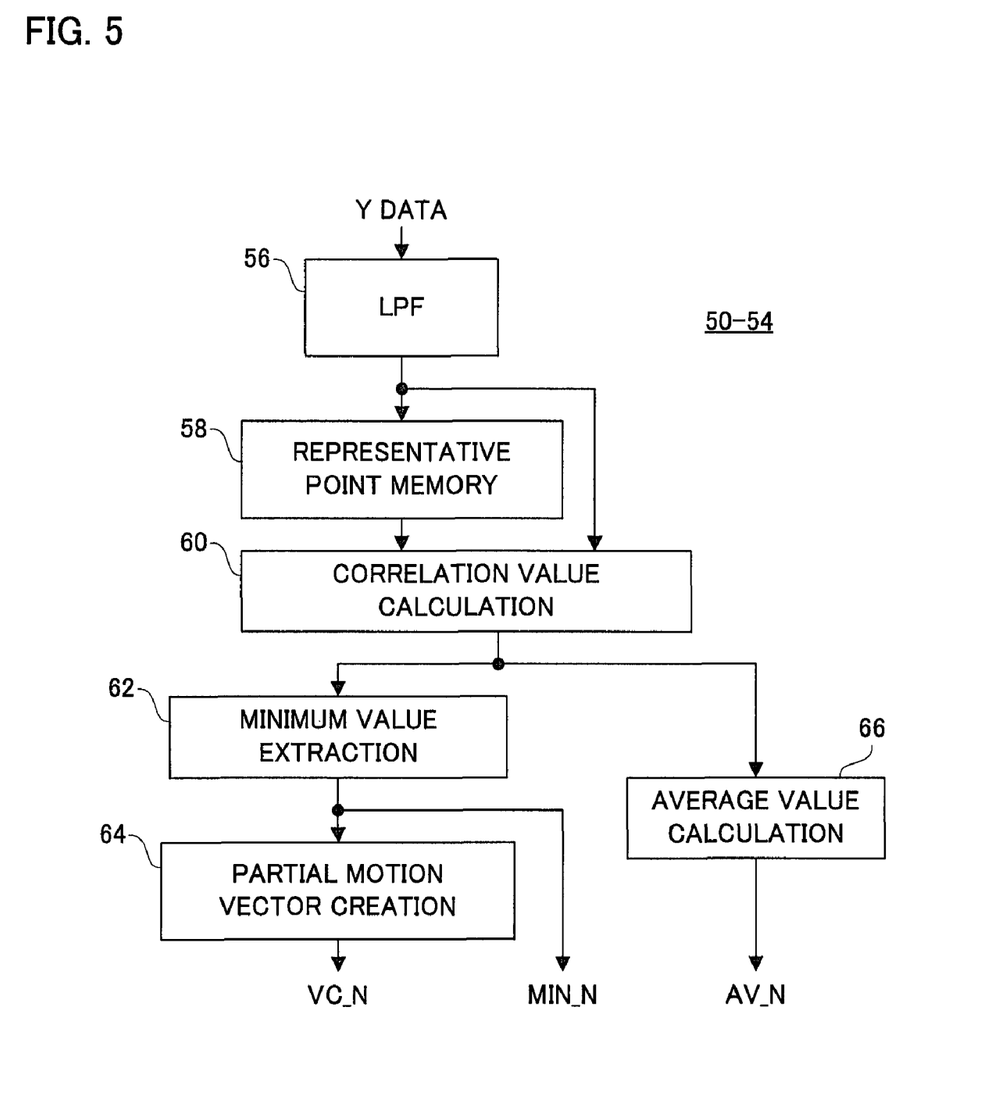
FIG. 5 is a block diagram showing one example of a configuration of a motion-information creating circuit applied to an embodiment in FIG. 4.
Figure 6:
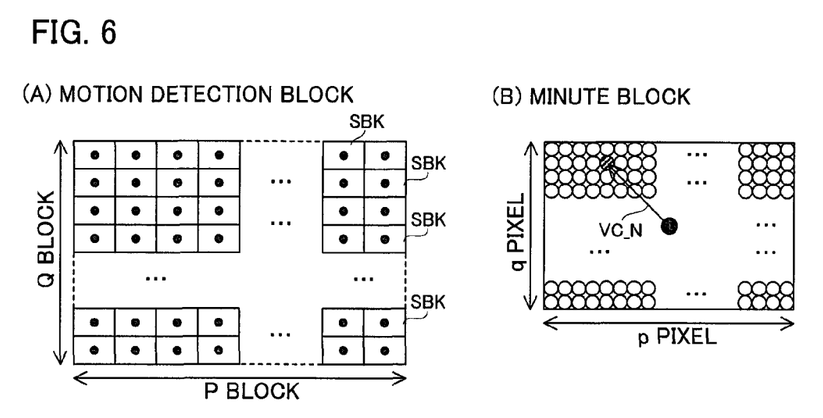
FIG. 6(A) is an illustrative view showing one example of a configuration of a motion detection block.
FIG. 6(B) is an illustrative view showing one example of a configuration of a minute block.

Each of the motion-information creating circuits 50 to 54 is configured as shown in FIG. 5. The Y data is subjected to a noise removal process in an LPF 56, and thereafter, applied to a representative point memory 58 and a correlation-value calculating circuit 60. With reference to FIG. 6(A), each of the motion detection blocks MD_1 to MD_5 is formed by P×Q of minute blocks SBK, SBK, . . . . Furthermore, with reference to FIG. 6(B), each of the minute blocks SBKs is formed by p×q of pixels. It is noted that each of "P", "Q", "p" and "q" is equivalent to an integer of 2 or more. Hereafter, a pixel present in the center of each of the minute blocks SBKs, i.e., pixels indicated by a black circle in FIG. 6(A) and FIG. 6(B), is defined as a "representative pixel".

Returning to FIG. 5, the representative point memory 58 extracts Y data of P×Q of representative pixels from the Y data belonging to the motion detection block MD_N (N: any number of 1 to 5), and stores the extracted Y data The correlation-value calculating circuit 60 calculates, as a correlation value, a difference between a Y data value of the representative pixel of a previous frame stored in the representative point memory 58 and a Y data value of each pixel of a current frame applied from an LPF 56, corresponding to each of P×Q of minute blocks SBK, SBK, . . . belonging to the motion detection block MD_N. As a result, P×Q×p×q of correlation values are outputted from the correlation-value calculating circuit 60 corresponding to the motion detection block MD_N. It is noted that each of P×Q×p×q of outputted correlation values is accompanied with a pixel-position information indicating positions of two pixels, which form the basis for the calculation of the correlation value.

The average-value calculating circuit 66 calculates an average value of P×Q×p×q of correlation values, and outputs the calculated average value as an average correlation value AV_N. The average correlation value AV_N is decreased as the contrast of the object scene belonging to the motion detection block MD_N is lower. As a result, when the average correlation value AV_N is noticed, it becomes possible to determine the level of contrast of the object scene.

A minimum-value calculating circuit 62 extracts a minimum value from the P×Q×p×q of correlation values, and outputs the extracted minimum value as a minimum correlation value MN_N. The minimum correlation value MIN_N is increased as a movement occurs in the motion detection block MD_N. Therefore, when the minimum correlation value MN_N is noticed, it becomes possible to determine whether or not any movement occurs in the object scene.

A partial-motion-vector creating circuit 64 creates a partial motion vector VC_N based on the pixel-position information accompanying the minimum correlation value MIN_N. In the created partial motion vector VC_N, an originating point is the pixel of the previous frame and an end point is the pixel of the current frame, out of the two pixels indicated by the pixel-position information. When the pixel of the current frame is that which is shown by hatching in FIG. 6(B), a direction and a size of the partial motion vector VC_N are shown by an arrow in FIG. 6(B).

Based on the partial motion vectors VC_1 to VC_5, the average correlation values AV_1 to AV_5, and minimum correlation values MN_1 to MN_5 thus created, the CPU 28 creates the total motion vector according to a procedure described below.

Firstly, the CPU 28 compares the average correlation value AV_N with a threshold value TH1_N, and when AV_N<TH1_N, a flag FLG_N is set to "0" while when AV_N≧TH1_N, the flag FLG_N is set to "1". The flag FLG_N is a flag for identifying the contrast of the object scene, i.e., the reliability of the motion of the object scene, captured in a motion detection area MD_N. When the average correlation value AV_N is small, the flag FLG_N is set to "0" regarding that the contrast i.e., the reliability of the motion, is low, whereas when the average correlation value AV_N is large, the flag FLG_N is set to "1" regarding that the contrast, i.e., the reliability of the motion, is high.

Furthermore, when the partial motion vector VC_N is below the threshold value TH2, the flag FLG_N indicates "0", and the minimum correlation value MIN_N is equal to or more than a threshold value TE3, the CPU 28 increases the threshold value TH1_N by ΔTH. Therefore, the threshold value TH1_N is increased when the moving object enters the motion detection area MD_N, in a state that the imaging surface is fixed and the motion detection area MD_N captures an object scene of low contrast. It is noted that the increased threshold value TH1_N is initialized when a designated time period elapses.

The CPU 28 further sets a weighted amount W_N to "1" when the flag FLG_N indicates "1", and on the other hand, sets the weighted amount W_N to "0" when the flag FLG_N indicates "0", and creates the total motion vector by a weighted average process of the partial motion vector VC_N referencing the weighted amount W_N thus determined. Specifically, the weighted average process is executed by using Equation 1.

$$TVC = \Sigma VC\_N * W\_N / \Sigma W\_N \quad (N: 1 \text{ to } 5) \quad \text{[Equation 1]}$$

TVC: Total motion vector

According to the Equation 1, the weighted amounts W_1 to W_5 are multiplied with the partial motion vectors VC_1 to VC_5, respectively, and a total sum of the five multiplied values acquired thereby is divided by a total sum of the weighted amounts W_1 to W_5. As a result, a magnitude relationship between the threshold value TH1_N increased according to an increase in the minimum correlation value MN_N and the average correlation value AV_N is reflected in the total motion vector.

Figure 7:
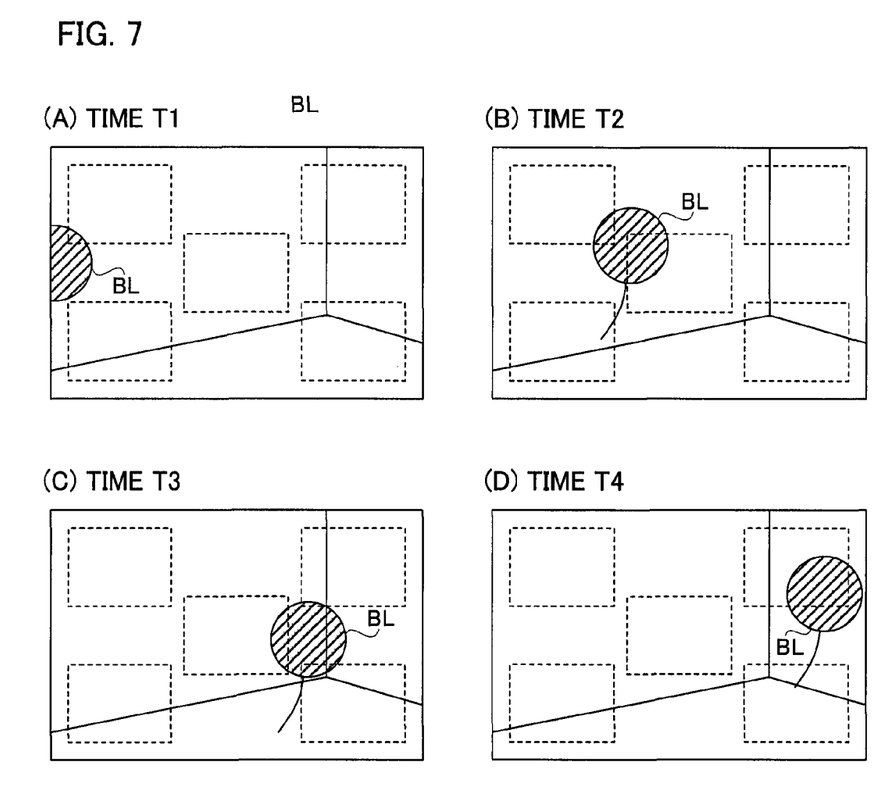
FIG. 7(A) is an illustrative view showing one example of an object scene captured at a time T1.
FIG. 7(B) is an illustrative view showing one example of an object scene captured at a time T2.
FIG. 7(C) is an illustrative view showing one example of an object scene captured at a time T3.
FIG. 7(D) is an illustrative view showing one example of an object scene captured at a time T4.

An operation when a balloon BL enters an object scene of low contrast is described with reference to FIG. 7(A) to FIG. 7(D). FIG. 7(A) shows a state of the object scene at a time T1, FIG. 7(B) shows a state of the object scene at a time T2, FIG. 7(C) shows a state of the object scene at a time T3, and FIG. 7(D) shows a state of the object scene at a time T4. Herein, it is assumed that as long as the balloon BL is not captured, the motion vector VC_N is below the threshold value TH2, and the minimum correlation value MIN_N is also below the threshold value TH3. Therefore, when the balloon BL is not captured, each of the weighted amounts W_1 to W_5 is set to "0", and an amount of the total motion vector is maintained at "0".

When the balloon BL starts entering the motion detection block MD_N, the minimum correlation value MN_N becomes equal to or more than the threshold value TH3 even though the average correlation value AV_N is still below the threshold value TH1_N and thereby, the threshold value TH1_N increases. Even though the average correlation value AV_N increases when the balloon BL further enters, the average correlation value AV_N is still below the threshold value TH1_N because the threshold value TH1_N is increased. As a result, regardless of the entry of the balloon BL, each of the weighted amounts W_1 to W_5 indicates "0", and the amount of the total motion vector is maintained at "0".

Thus, the minimum correlation value MIN_N obtained corresponding to the motion detection block MD_N increases when the moving object enters the motion detection block MD_N. When the motion detection block MD_N is a block in which an object scene having a contrast below the threshold value TH1_N is captured, the threshold value TH1_N increases because of the entry of the moving object. Regardless of the increase in the contrast due to the entry of the moving object, the object scene captured by the motion detection block MD_N is determined as a partial object scene having the contrast below the threshold value TH1_N. As a result, it becomes difficult for the motion of the moving object to be reflected in the motion detection of the entire object scene, and thus, it becomes possible to reduce an erroneous detection of the motion of the entire object scene.

Figure 8:
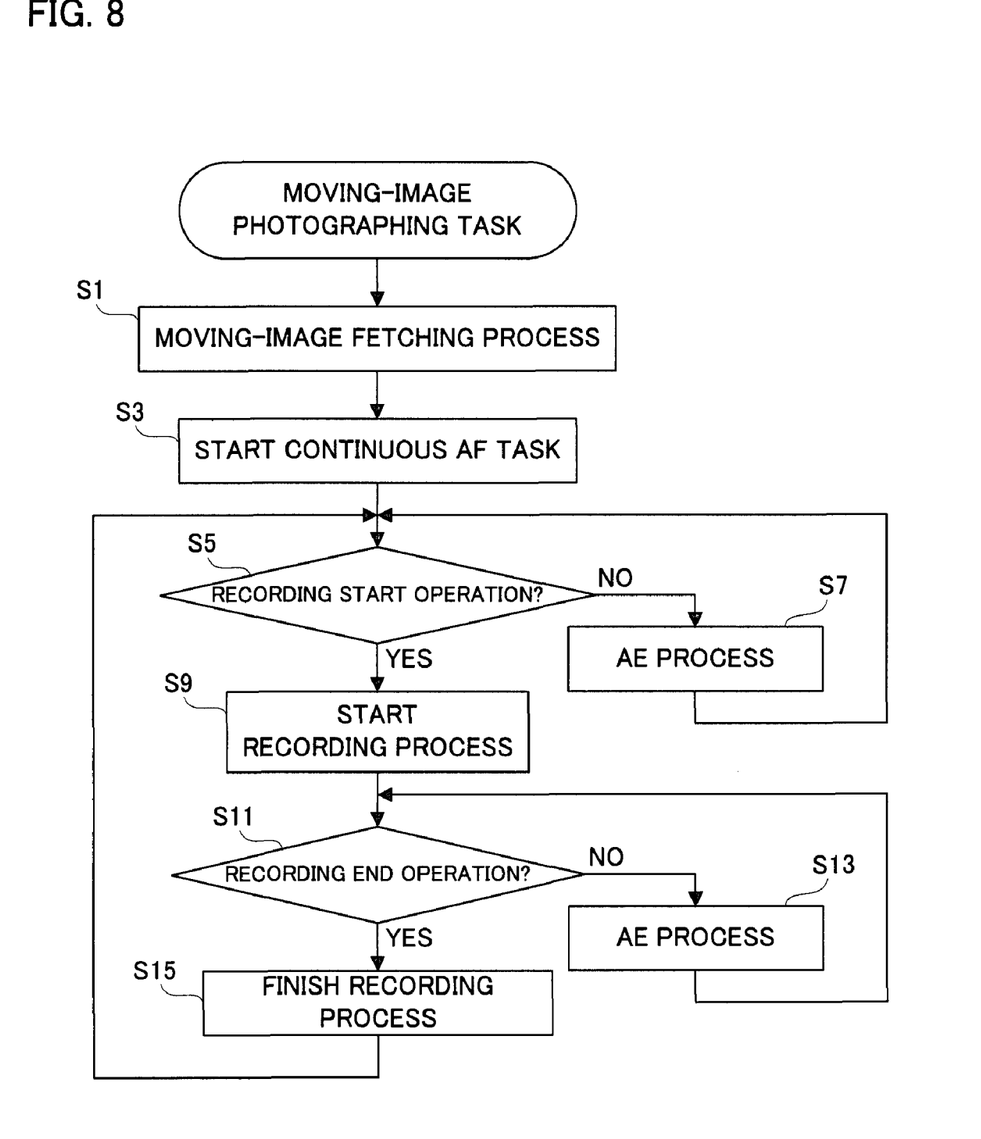
FIG. 8 is a flowchart showing one portion of an operation of a CPU applied to the embodiment in FIG. 1.
Figure 9:
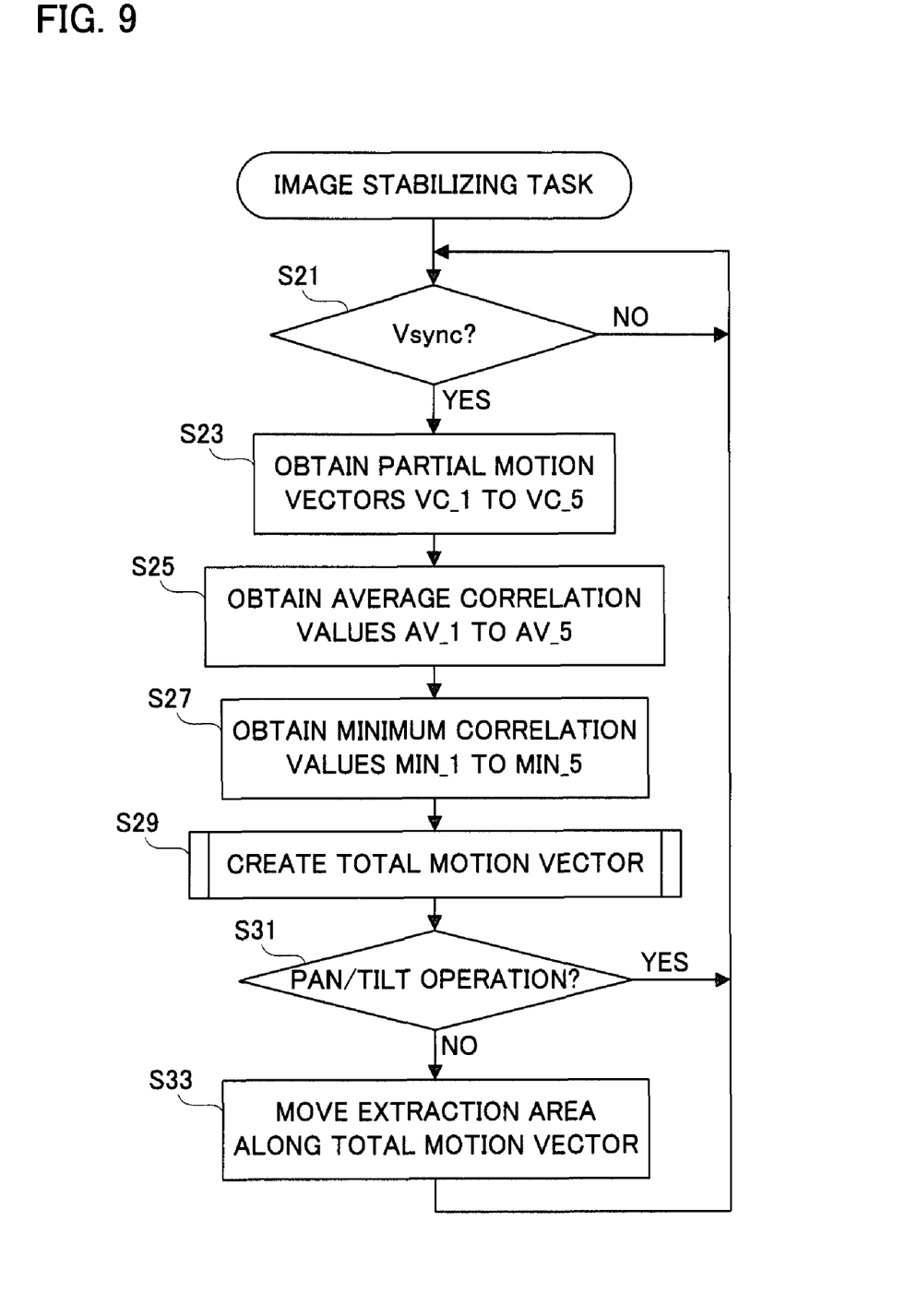
FIG. 9 is a flowchart showing another portion of the operation of the CPU applied to the embodiment in FIG. 1.
Figure 10:
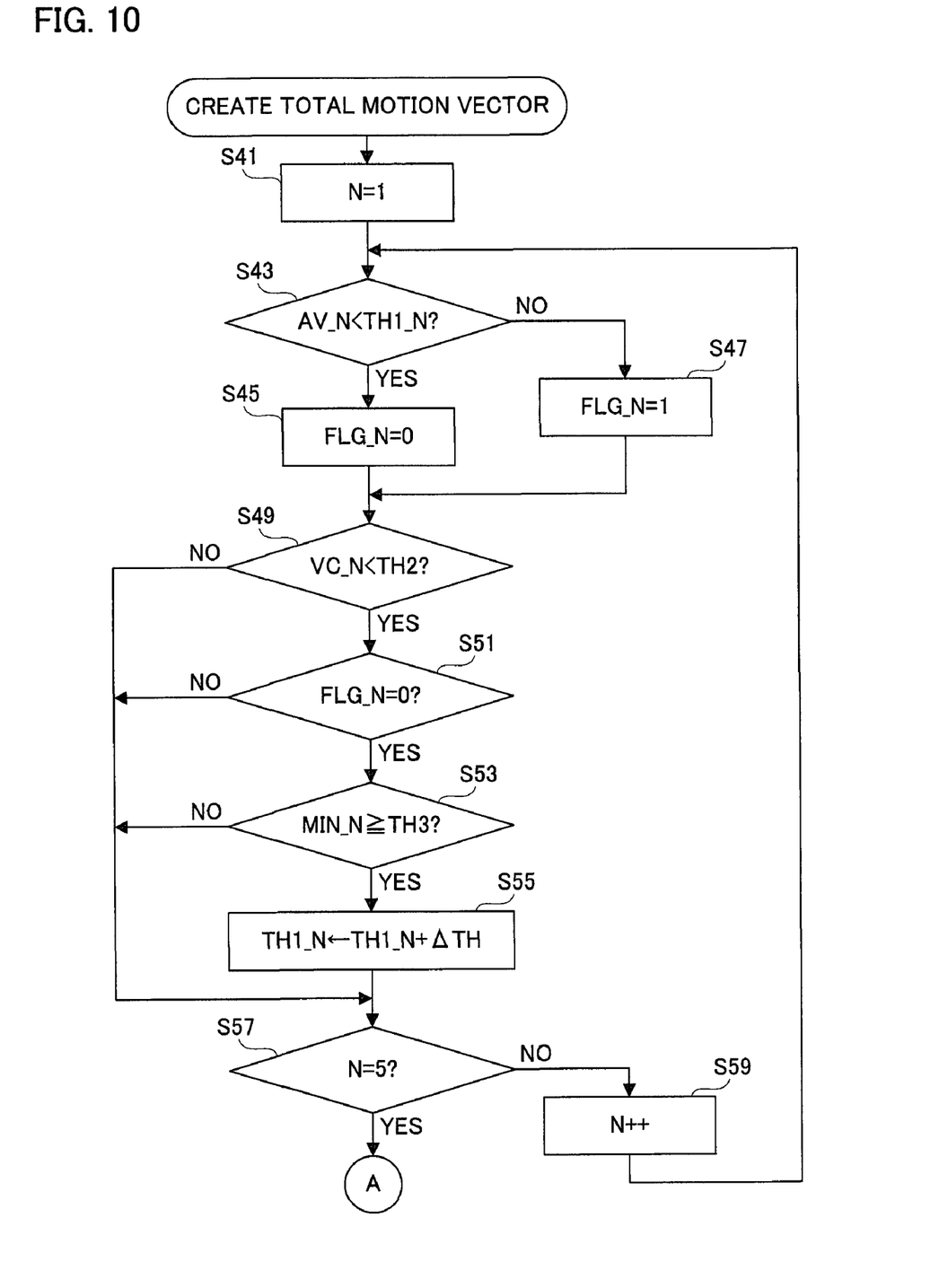
FIG. 10 is a flowchart showing still another portion of the operation of the CPU applied to the embodiment in FIG. 1.
Figure 11:
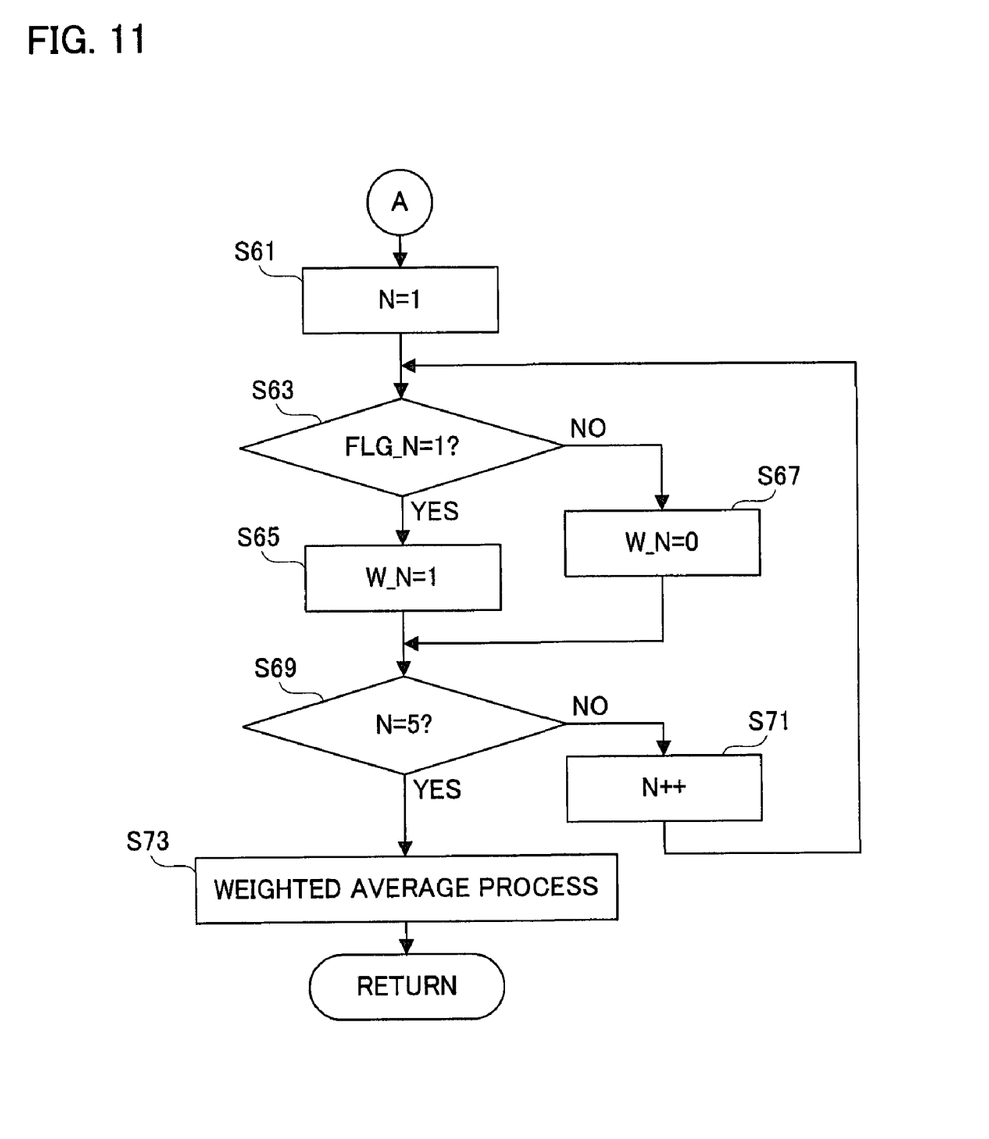
FIG. 11 is a flowchart showing yet still another portion of the operation of the CPU applied to the embodiment in FIG. 1.
Figure 12:
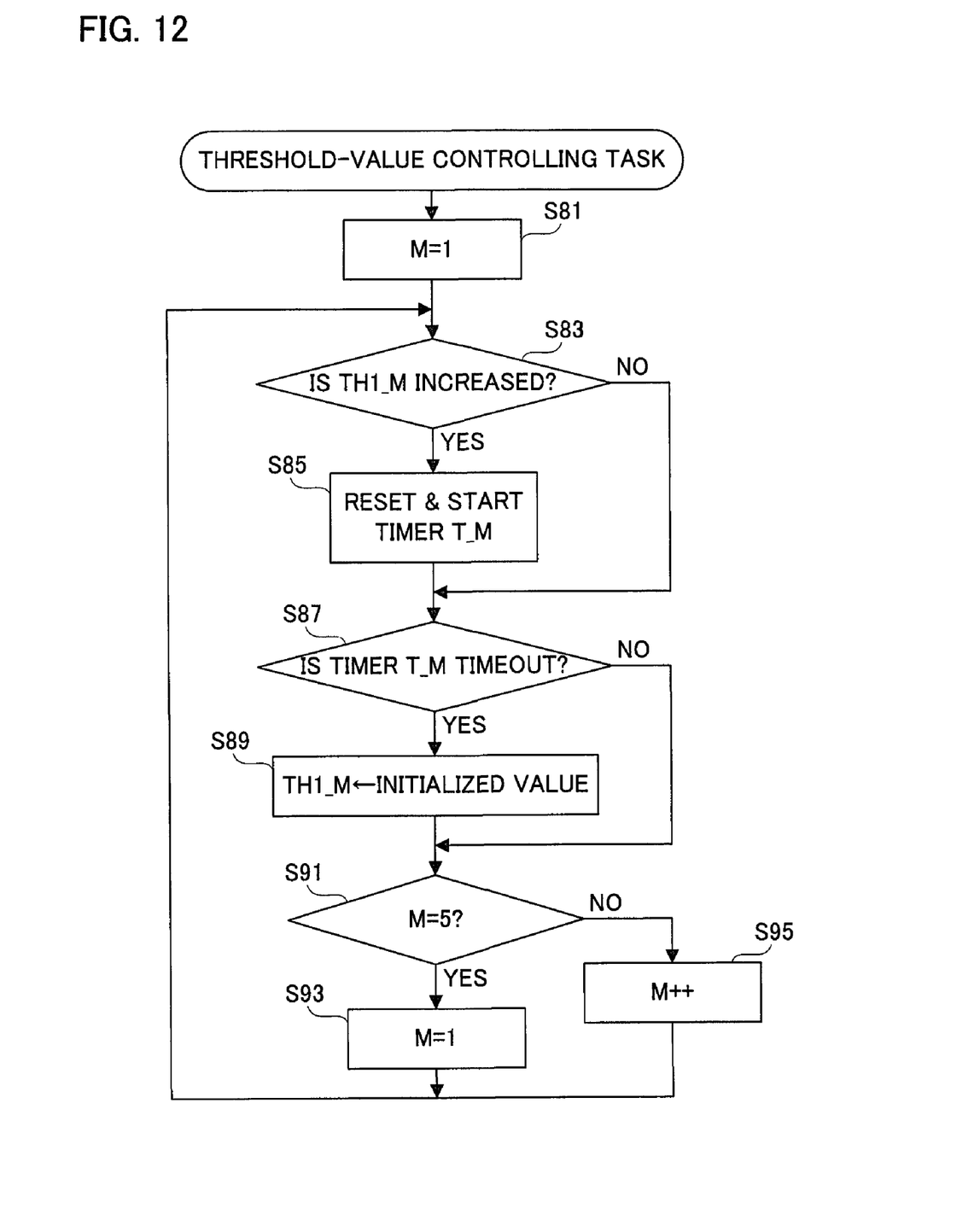
FIG. 12 is a flowchart showing another portion of the operation of the CPU applied to the embodiment in FIG. 1.

The CPU 28 processes a plurality of tasks including a moving-image photographing task shown in FIG. 8, a image stabilizing task shown in FIG. 9 to FIG. 11, and a threshold-value controlling task shown in FIG. 12, in a parallel manner. It is noted that control programs corresponding to these tasks are stored in a flash memory 46.

With reference to FIG. 8, a moving-image fetching process is executed in a step S1, and a continuous AF task is started in a step S3. As a result of the process of the step S1, a through image is outputted from the LCD monitor 40, and as a result of the process of the step S3, a focus is adjusted successively. In a step S5, it is determined whether or not a recording start operation is performed, and as long as NO is determined, an AE process of a step S7 is repeated. Thereby, an exposure amount is adjusted moderately. When the recording start operation is performed, the process proceeds to a step S9 in which the I/F 42 is started in order to start a recording process. In a step S11, it is determined whether or not a recording end operation is performed, and as long as NO is determined, an AE process of a step S13 is repeated. When the recording end operation is performed, the process proceeds to a step S15 in which the I/F 42 is stopped in order to finish the recording process. Upon completion of the process in the step S15, the process returns to the step S5.

With reference to FIG. 9, it is determined in a step S21 whether or not the vertical synchronization signal Vsync is generated. When YES is determined, the partial motion vectors VC_1 to VC_5 are fetched from the motion detection circuit 22 in a step S23, the average correlation values AV_1 to AV_5 are fetched from the motion detection circuit 22 in a step S25, and the minimum correlation values MIN_1 to MIN_5 are fetched from the motion detection circuit 22 in a step S27.

In a step S29, the total motion vector is created based on these fetched motion information. In a subsequent step S31, it is determined whether or not the motion of the imaging surface at the current time point is caused due to the pan/tilt operation based on the total motion vector. When YES is determined in this step, the process returns to the step S21 as it is, and when NO is determined, the process proceeds to a step S33. In the step S33, the extraction area EX is moved along the total motion vector created in the step S29. Upon completion of the process in the step S33, the process returns to the step S21.

A motion-vector creating process in the step S29 shown in FIG. 9 is executed according to a flow chart shown in FIG. 10 and FIG. 11.

Firstly, a variable N is set to "1" in a step S41, and then in a step S43, it is determined whether or not the average correlation value AV_N is below the threshold value TH1_N. When YES is determined in this step, the flag FLG_N is set to "0" in a step S45, and when NO is determined, the flag FLG_N is set to "1" in a step S47. It is determined in a step S49 whether or not the partial motion vector VC_N is below the threshold value TH2, it is determined in a step S51 whether or not the flag FLG_N indicates "0", and it is determined in a step S53 whether or not the minimum correlation value MN_N is equal to or more than the threshold value TH3. When NO is determined in any one of the steps S49 to S53, the process proceeds to a step S57 as it is. When YES is determined in all of the steps S49 to S53, the process proceeds to a step S57 after increasing the threshold value TH1_N by ΔTH in a step S55.

It is determined in the step S57 whether or not the variable N reaches "5", and when NO is determined, the process returns to the step S43 after incrementing the variable N in a step S59 while YES is determined, the process proceeds to processes from step S61 onwards. In the step S61, the variable N is returned to "1", and in a step S63, it is determined whether or not the flag FLG_N is "1". When YES is determined in this step, the weighted amount W_N is set to "1" in a step S65, and when NO is determined, the weighted amount W_N is set to "0" in a step S67. It is determined in a step S69 whether or not the variable N reaches "5", and when NO is determined, the process returns to the step S63 after incrementing the variable N in a step S71 while YES is determined, the process is restored to the routine of the upper hierarchical level after performing the weighted average process according to the Equation 1 in a step S73.

With reference to FIG. 12, a variable M is set to "1" in a step S81. It is determined in a step S83 whether or not the threshold value TH_M is increased, and when NO is determined, the process proceeds to a step S87 as it is while YES is determined, the process proceeds to the step S87 after resetting and starting a timer T_M in a step S85. It is determined in the step S87 whether or not a timeout is generated in the timer T_M, and when NO is determined, the process proceeds to a step S91 as it is while YES is determined, the process proceeds to the step S91 after initializing the threshold value TH_M in a step S89. It is determined in the step S91 whether or not the variable M reaches "5", and when NO is determined, the process returns to the step S83 after incrementing the variable M in the step S95 while YES is determined, the process returns to the step S83 after restoring the variable M to "1" in a step S93.

As understood from the description above, the CPU 28 detects the partial motion vectors VC_1 to VC_5 that indicate the motion of the partial object scenes captured in the motion detection blocks MD_1 to MD_5 allocated to the object scene, based on the raw image data outputted repeatedly from the image sensor 16 (S23). The CPU 28 also reduces the weighted amount allocated to the block in which the partial object scene having a contrast below a reference (=threshold value TH1_N) is captured, out of the weighted amounts W_1 to W_5 allocated respectively to the motion detection blocks MD_1 to MD_5 (S43 and S45). The CPU 28 further performs the weighted average process referring to the weighted amounts W_1 to W_5 on the partial motion vectors VC_1 to VC_5 so as to detect the motion of the entire object scene (S61 to S73). The CPU 28 repeatedly obtains the minimum correlation values MN_1 to MN_5 of a luminance difference between the frames of the raw image data outputted from the image sensor 16, corresponding to the motion detection blocks MD_1 to MD_5, respectively (S27). The CPU 28 executes the process for increasing the reference according to the increase in the obtained minimum correlation value, corresponding to the block in which the partial object scene having the contrast below the reference is captured (S51 to S55).

The minimum correlation value MIN_N obtained corresponding to the motion detection block MD_N increases when the moving object enters the motion detection block MD_N. When the motion detection block MD_N is a block in which the partial object scene having the contrast below the reference is captured, this reference is increased by the entry of the moving object. Regardless of the increase in the contrast caused due to the entry of the moving object, the partial object scene captured in the motion detection block MD_N is determined as a partial object scene having the contrast below the reference. As a result, it becomes difficult for the motion of the moving object to be reflected in the motion detection of the entire object scene, and thus, it becomes possible to reduce the erroneous detection of the motion of the entire object scene.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion detection apparatus, comprising:
a first detector which detects a motion of a partial scene captured in each of a plurality of blocks allocated to a scene based on image data repeatedly outputted from an imager;
a reducer which reduces a weighted amount allocated to a block in which a partial scene having a contrast below a reference is captured, out of a plurality of weighted amounts respectively allocated to the plurality of blocks;
a second detector which detects a motion of the entire scene by performing a weighted average process in which the plurality of weighted amounts adjusted by a process of said reducer are referenced on the motion detected by said first detector;
a first obtainer which repeatedly obtains a minimum value of a luminance difference between screens of the image data outputted from said imager, corresponding to each of the plurality of blocks; and
an increaser which executes a process for increasing the reference according to an increase of the minimum value obtained by said first obtainer, corresponding to the block in which the partial scene having the contrast below the reference is captured.

2. A motion detection apparatus according to claim 1, further comprising a second obtainer which repeatedly obtains an average value of a luminance difference between screens of image data outputted from said imager, corresponding to each of the plurality of blocks, wherein said reducer includes a comparator which compares the average value obtained by said second obtainer with the reference so as to determine the contrast.

3. A motion detection apparatus according to claim 1, further comprising an extractor which extracts one portion of the image data outputted from said imager so that a motion detected by said second detector is compensated.

4. A motion detection apparatus according to claim 3, wherein said extractor includes: a writer which writes the image data outputted from said imager into a memory; a reader which reads out one portion of image data belonging to an extraction area, out of the image data accommodated in said memory by said writer; and a changer which changes a position of the extraction area so that the motion detected by said second detector is compensated.

5. A motion detection apparatus according to claim 1, further comprising a starter which starts said increaser corresponding to the block in which a scene having a motion amount below a threshold value is captured.

6. A motion detection apparatus according to claim 1, further comprising an initializer which initializes the reference increased by said increaser after an elapse of a designated period.

7. A motion detection apparatus according to claim 1, wherein each of the plurality of blocks includes a plurality of minute blocks, said motion detection apparatus further comprising a difference calculator which calculates a difference between luminance of a representative pixel in image data of a previous screen and luminance of each of a plurality of pixels in image data of a current screen, for each minute block.

8. A computer program embodied in a tangible medium, which is executed by a processor of a motion detection apparatus, said program comprising:
- a first detecting step of detecting a motion of a partial scene captured in each of a plurality of blocks allocated to a scene based on image data repeatedly outputted from an imager;
- a reducing step of reducing a weighted amount allocated to a block in which a partial scene having a contrast below a reference is captured, out of a plurality of weighted amounts respectively allocated to the plurality of blocks;
- a second detecting step of detecting a motion of the entire scene by performing a weighted average process in which the plurality of weighted amounts adjusted by a process of said reducing step are referenced on the motion detected in said first detecting step;
- an acquiring step of repeatedly acquiring a minimum value of a luminance difference between screens of image data outputted from said imager, corresponding to each of the plurality of blocks; and
- an increasing step of executing a process for increasing the reference according to an increase of the minimum value obtained in said acquiring step, corresponding to the block in which the partial scene having the contrast below the reference is captured.

9. A motion detection method executed by a motion detection apparatus, comprising:
- a first detecting step of detecting a motion of a partial scene captured in each of a plurality of blocks allocated to a scene based on image data repeatedly outputted from an imager;
- a reducing step of reducing a weighted amount allocated to a block in which a partial scene having a contrast below a reference is captured, out of a plurality of weighted amounts respectively allocated to the plurality of blocks;
- a second detecting step of detecting a motion of the entire scene by performing a weighted average process in which the plurality of weighted amounts adjusted by a process of said reducing step are referenced on the motion detected in said first detecting step;
- an acquiring step of repeatedly acquiring a minimum value of a luminance difference between screens of image data outputted from said imager, corresponding to each of the plurality of blocks; and
- an increasing step of executing a process for increasing the reference according to an increase of the minimum value obtained in said acquiring step, corresponding to the block in which the partial scene having the contrast below the reference is captured.

* * * * *